(12) United States Patent
Ogawa

(10) Patent No.: US 6,214,268 B1
(45) Date of Patent: *Apr. 10, 2001

(54) BLOW-MOLDED HOSES AND APPARATUSES FOR PRODUCING THE SAME

(75) Inventor: Masaaki Ogawa, Kobe (JP)

(73) Assignee: Tigers Polymer Corporation, Toyonaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 28 days.

(21) Appl. No.: 09/025,340

(22) Filed: Feb. 18, 1998

(30) Foreign Application Priority Data

Feb. 18, 1997 (JP) .................................................. 9-050900

(51) Int. Cl.$^7$ ...................................................... B29C 49/04
(52) U.S. Cl. .............................. 264/171.26; 264/171.28; 264/173.16
(58) Field of Search ...................................... 264/541, 515, 264/171.26, 171.28, 173.16, 173.19; 138/172, 174, 177, 178, DIG. 7; 428/36.9, 36.91, 36.92

(56) References Cited

U.S. PATENT DOCUMENTS

| | | | |
|---|---|---|---|
| 3,752,617 | * 8/1973 | Burlis | 425/131 |
| 4,149,839 | * 4/1979 | Iwawaki | 425/532 |
| 4,472,129 | * 9/1984 | Siard | 264/541 |
| 4,907,957 | * 3/1990 | Nakagawa et al. | 425/132 |
| 5,156,857 | * 10/1992 | Wang | 264/176.1 |
| 5,785,920 | * 7/1998 | Ogawa | 264/541 |

FOREIGN PATENT DOCUMENTS

| | | |
|---|---|---|
| 51-134758 | 11/1976 | (JP) . |
| 52-37026 | 9/1977 | (JP) . |
| 57-53175 | 11/1982 | (JP) . |
| 3-5286 | 1/1991 | (JP) . |
| 08014445 | 1/1996 | (JP) . |

* cited by examiner

Primary Examiner—Michael W. Ball
Assistant Examiner—Barbara J. Musser
(74) Attorney, Agent, or Firm—Pillsbury Madison & Sutro LLP

(57) ABSTRACT

The blow-molded hose of a synthetic resin of the present invention is produced by blow-molding a single parison comprising a soft resin and a hard resin. The blow-molded hose comprises a monolayer (or single-layer) segment formed with either a soft resin layer or a hard resin layer and multilayer (laminating) segment formed with the soft resin layer and the hard resin layer, wherein, in the multilayer (laminating) segment, the thickness of the resin layer forming the monolayer segment is thinner than that of the other resin layer. Practically, the monolayer segment comprises the soft resin layer and forms the connection end (s) at the end (s) of the hose.

2 Claims, 3 Drawing Sheets

BLOW-MOLDED HOSES AND APPARATUSES FOR PRODUCING THE SAME

FIELD OF THE INVENTION

The present invention relates to a blow-molded hose of a synthetic resin useful for use, for example, ducts of an intake system of an automobile engine, and to an apparatus for producing the blow-molded hose.

BACKGROUND OF THE INVENTION

As the blow-molded hose of the synthetic resin, Japanese Patent Laid open No. 14445/1996 (JP-A-8-14445) discloses a blow-molding pipe or hose. The blow-molded hose is prepared by blow-molding a parison having a laminating structure of a soft resin layer and a hard resin layer with varying partially the thickness ratio of the soft and hard resin layers in the longitudinal direction in order to form mutually a flexible soft portion and a rigid portion for shape reinforcement. However, when the flexible soft portion is formed at a joint or connection edge of the duct or hose for connecting with other parts or members, the flexibility of the soft resin portion is deteriorated by the hard resin since the hard resin layer is laminated on the soft resin layer irrespective of the thickness ratio. Therefore, the joint or connection characteristics with the other members such as a metal pipe are lowered and the high sealing at the connection site cannot be realized.

A multilayer (multi-walled) hose or tube is manufactured by extruding molten resin in the form of a parison from an annular die slit, setting the parison in a mold, and carrying out blowing. In this molding operation, molten resin from a resin feeding side-port flows down a circumferential annular passageway and is extruded in an axial (downward) direction from an annular die slit. Therefore, not only the flow and flow rate of molten resin are complicated but also a large pressure disparity between the part corresponding to the resin feeding port and the part opposed to the feeding port, as well as a pressure strain, is created to cause variations in thickness, with the result that a hollow body of uniform wall thickness can hardly be obtained. Particularly in the extrusion-blow molding of a multi-walled hollow product, such a variation tends to occur more readily in each constituent layer.

To correct for such variations in thickness of the parison and hollow product, it is common practice to displace the die in a horizontal direction with an adjusting bolt so as to change the slit dimension between the die and the mandrel. Japanese Patent Laid-open No. (JP-A-)51-134758 discloses an extrusion molding technology for the production of a multi-walled hollow tube wherein while the thickness ratio of constituent layers of the multi-walled structure is controlled by judicious setting of the co-extrusion speeds of the ring piston, the exit width of the resin passageway downstream of the point of convergence of resin streams for respective layers is adjusted by the vertical displacement of the mandrel or the horizontal displacement of the die so as to control the wall thickness. This literature further teaches the utilization of the horizontal displacement of the die for offset control.

Japanese Patent Publication No. (JP-B-)3-5286 discloses a prior art technology which comprises constituting a die with a flexible ring and pressing both lateral sides of the die with actuators to deform the die into an elliptical shape to thereby adjust the annular slit between the die and the mandrel and correct for a variation in thickness of the parison.

However, since the points of variation in thickness of a parison are not diametrically opposed, it is still difficult to obtain a parison and hollow tube of uniform wall thickness even if the thicknesses at opposed points are adjusted. Particularly in the production of a multi-walled hollow product, thickness variations may occur respective constituent layers so that the thickness of the parison cannot be controlled with accuracy.

Furthermore, in the intermittent production of parisons and hollow tubes using an extrusion-blow molding machine, the variations in thickness result in resin leaks through the clearance between the die and the mandrel. Thus, the intermittent production of parisons and hollow tubes comprises raising the ring piston to close the annular slit between the die and the mandrel, collecting a parison-equivalent amount of molten resin in the accumulation chamber, driving a rod of the mandrel forward to form an annular slit, lowering the ring piston to expel the molten resin from the accumulation chamber to form a parison having a wall thickness corresponding to the slit dimension, and driving the rod and mandrel back to close the annular slit, all as a cycle on an intermittent basis.

Such being the process, when the rod is driven back after the above thickness adjustment of the parison by the adjusting bolt, the annular slit cannot be hermetically closed by the mandrel because of the offset of the die with respect to the mandrel so that a gap typically as wide as about 1 mm is formed between the die and the mandrel. Then, as molten resin is collected in the accumulation chamber with the annular slit having been closed by the mandrel, the resin leaks out from the gap. Therefore, in the long-time repeated production of many parisons and hollow products, a large waste of resin takes place to detract from effective utilization of the resin and economics of production.

Furthermore, as the rod is driven back with a strong force with the die offset from the mandrel, a bending force, instead of an axial force, acts on the rod along the taper of the die and the mandrel to bend the rod and injure the joint between the mandrel and rod. Therefore, the rod should be driven back as gently as possible to let the mandrel be abutted against the head.

Moreover, according to the above operation, a monolayered flexible segment or rigid segment and a laminated segment of the hose or tube can hardly be constructed with high precision because the resin leakage cannot be completely prevented.

Japanese Patent Publication No. (JP-B-)52-37026 discloses an extrusion molding apparatus for multi-walled tubes which, for the purpose of preventing variation in thickness and bending of the parison without adjusting the clearance between the die at the tip of a head and the mandrel, comprises a cylindrical wall element having a temperature regulating function disposed in a laminar arrangement to provide a plurality of cylindrical resin accumulation chambers within a blow-molding head, an extruder for extruding a resin into the accumulation chambers, and a slidable ring piston for expelling the resin from the accumulation chambers. Japanese Patent Publication No. (JP-B) 57-53175 discloses an extrusion molding apparatus comprising a molding head having a die and an annular passageway, a cylindrical partitioning wall and a ring piston as disposed in a laminar, vertically slidable relation in the molding head so as to form a cylindrical accumulation chamber, and an extruding means for extruding a polymer from the cylindrical accumulation chamber. It is taught in these literature that the ring piston is raised (driven back) to prevent leakage of resin from the clearance between the die and the mandrel.

However, since the resin is aspirated into the accumulation chamber by driving the ring piston back so as to prevent leakage, it is necessary that an excess or more than one parison-equivalent of resin should be accumulated in the accumulation chamber. Therefore, the excess of resin in the accumulation chamber is also extruded in the formation of a parison, so that the desired effective utilization of resin cannot be materialized.

SUMMARY OF THE INVENTION

It is an object of the present invention to provide a blow-molded hose or tube comprising a flexible segment and a rigid segment, wherein the segments are precisely or accurately formed in the longitudinal direction, and to provide an extrusion molding apparatus for producing the blow-molded hose or tube.

It is another object of the present invention to provide a blow-molded hose or tube, an extrusion molding apparatus and a hollow tube molding method, wherein the high sealing properties at the connection or joint edges or end(s) of a hose can be achieved.

It is a further object of the present invention to provide a blow-molding hose or tube, an extrusion molding apparatus and a hollow tube molding method, wherein the soft and hard segments of a hose can be accurately constructed with closing tight the slit between the die and the mandrel to preclude resin leaks with certainty.

The inventor of the present invention did much research to accomplish the above-mentioned objects and found that if a single-layered segment (or unit) of a soft resin or a hard (or rigid) resin and a multi-layered segment (or unit) having a laminating structure comprising a soft resin layer and a hard resin layer are formed mutually in the longitudinal direction, a high flexibility and shape reinforcement can be imparted to the hose by flexible segment and a rigid segment. The present invention has been developed on the basis of the above finding.

Thus, the blow-molded hose of a synthetic resin according to the present invention is a hose produced by blow-molding a single parison, comprising a soft resin and a hard resin, and which comprises a monolayer (or single-layer) segment formed with either a soft resin layer or a hard resin layer and a multilayer (laminating) segment formed with the soft resin layer and the hard resin layer, wherein, in the multilayer (laminating) segment, the thickness of the resin layer forming the monolayer segment is thinner than that of the other resin layer of the two resin layers. Practically, the monolayer segment comprises the soft resin layer and forms the connection end(s) at the end(s) of the hose. Since the hose or tube of the present invention provides with the monolayer segment of, for example, the soft resin layer, the other resin layer such as the hard resin layer does not adversely affect on the properties of the soft resin layer. Thus, a bellow portion of the hose and/or the end of the hose may be formed with the soft resin as the monolayer segment, the high flexibility can be imparted to the bellow portion and/or the connection end of the hose.

Further, the present hose is manufactured with a parison, the molding may be conducted with use of a conventional multi-blow molding apparatus, and it is unnecessary to use a molding apparatus provided with a complicated mechanism such as a completely resin-alternating mechanism (for example, a shut/off valve) which is disclosed in Japanese Patent Laid open No. 245912/1993 (JP-A-5-245912) and which is required for formation of a single-layer parison.

The extrusion molding apparatus of the present invention comprises, for extruding a parison corresponding to the hose from an annular slit on an intermitted basis, a die, a mandrel which is axially slidable with respect to the die to form an annular slit therebetween, a rod for driving the mandrel axially with respect to the die, an annular passageway including a molten resin accumulation chamber communicable with the annular slit, a supply means for feeding the molten resin to the annular passageway. The apparatus further comprises a thickness adjusting means for displacing the die from an original position adjoining to the mandrel in timed relation with the advance of a rod to adjust the wall thickness of a parison being extruded from the annular slit, an extruding means for extruding the resin accumulated in the molten resin accumulation chamber through the annular slit to form a parison, a resetting means which, in response to completion of extrusion of the resin, resets the die to the original position, and a rod driving mechanism for driving the rod forward to form the annular slit and, in response to resetting of the die, driving the rod in a reverse direction to close the annular slit, wherein the annular passageway comprises a first annular passageway, for a first resin either of a soft resin or a hard resin, including a first molten resin accumulation chamber communicable with the annular slit and a second annular passageway, for a second resin of the other resin of the two resins, including a second molten resin accumulation chamber communicable with the annular slit and being joinable the second resin with the first resin, the supply means comprises a first supply means for feeding the first molten resin to the first annular passageway and a second supply means for feeding the second molten resin to the second annular passageway, and the extruding means comprises a first extruding means for extruding continuously the first resin accumulated in the first molten resin accumulation chamber and a second extruding means for extruding, at a predetermined time interval, the second resin accumulated in the second molten resin accumulation chamber.

The molding method of the present invention comprises extruding a resin accumulated in a molten resin accumulation chamber from an annular slit defined by a die and a mandrel to from a parison, wherein the method comprises a step of driving the rod forward to open the annular slit and displacing the die from an original position adjoining to the mandrel to correct for the thickness of the parison to be extruded from the annular slit, a step of extruding continuously the first resin accumulated in the first accumulation chamber from the annular slit, with extruding and joining, at a time interval, the second resin accumulated in a second accumulation chamber with the first resin, a step of resetting the die to the original position after extrusion of resin, a step of driving the rod back after the resetting of the die to cause the annular slit to be closed by the mandrel, and a step of accumulating molten resins in the accumulation chambers after closure of the annular slit, all of the steps being executed as a cycle to form parisons on an intermitted basis.

DETAILED DESCRIPTION OF THE INVENTION

The present invention is now described in detail with reference to the accompanying drawings.

Figure 1:
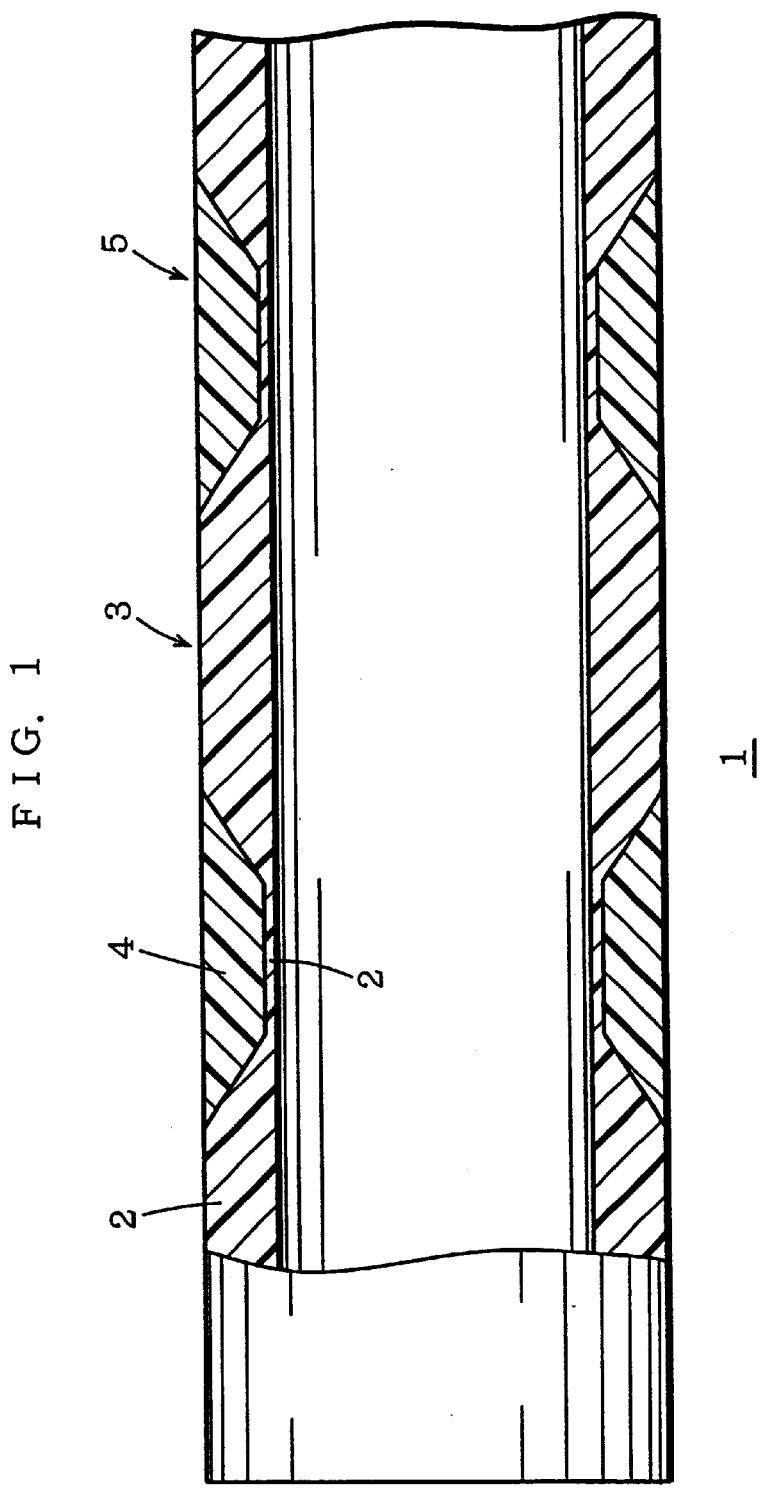
FIG. 1 is a generally section view showing an exemplary blow-molded hose of the invention.

Now referring to FIG. 1, a blow-molded hose 1 of a synthetic resin according to the present invention comprises a monolayer segment (unit) 3 of a synthetic soft resin layer 2 and a multilayer (laminating) segment (unit) 5 in which, a synthetic hard resin layer 4 and the synthetic soft resin layer 2 are laminated each other, and is produced by blow-molding a single parison corresponding to the hose 1. The monolayer segment 3 and the multi-layer (laminating) segment are formed integrally and arranged mutually in the longitudinal direction. The synthetic soft resin includes, for example, olefinic resins such as polyethylens (a low-density polyethylene, a middle-density polyethylene, a linear low-density polyethylene and etc.), ethylene copolymers (ethylene-vinyl acetate copolymer, ethylene-ethyl acrylate copolymer and etc.), a plastisized polyvinyl chloride, polyurethanes, thermoplastic elastomer (polyester elastomer, polyamide elastomer, polyurethane elastomer, olefinic elastomer and etc.) and so on. The examples of the hard resin are olefinic polymers (polypropylens, a high-density polyethylene, ethylene-propylene copolymer and the like), a polyvinyl chloride, and the like.

Further, in the multilayer (laminating) segment 5, the thickness of the synthetic hard resin layer 4 is thicker than that of the synthetic soft resin layer 2. Namely, the soft resin layer 2 forming the monolayer segment 3 is thinner than that of the hard resin layer 4.

In the above embodiment, the monolayer segment portion may be molded and formed in the form of a bellow structure or formed as a connection or joint site at the edge(s) or end(s) of the hose. Further, the monolayer segment may be formed with the synthetic hard resin, and, in the multilayer segment, the thickness ratio of the soft resin layer relative to the hard resin layer may become larger.

The thickness ratio of the soft resin layer relative to the hard resin layer in the multilayer segment may be, for example, about 5/95 to 95/5(%), preferably 10/90 to 90/10 (%), and more preferably 20/80 to 80/20(%).

Figure 2:
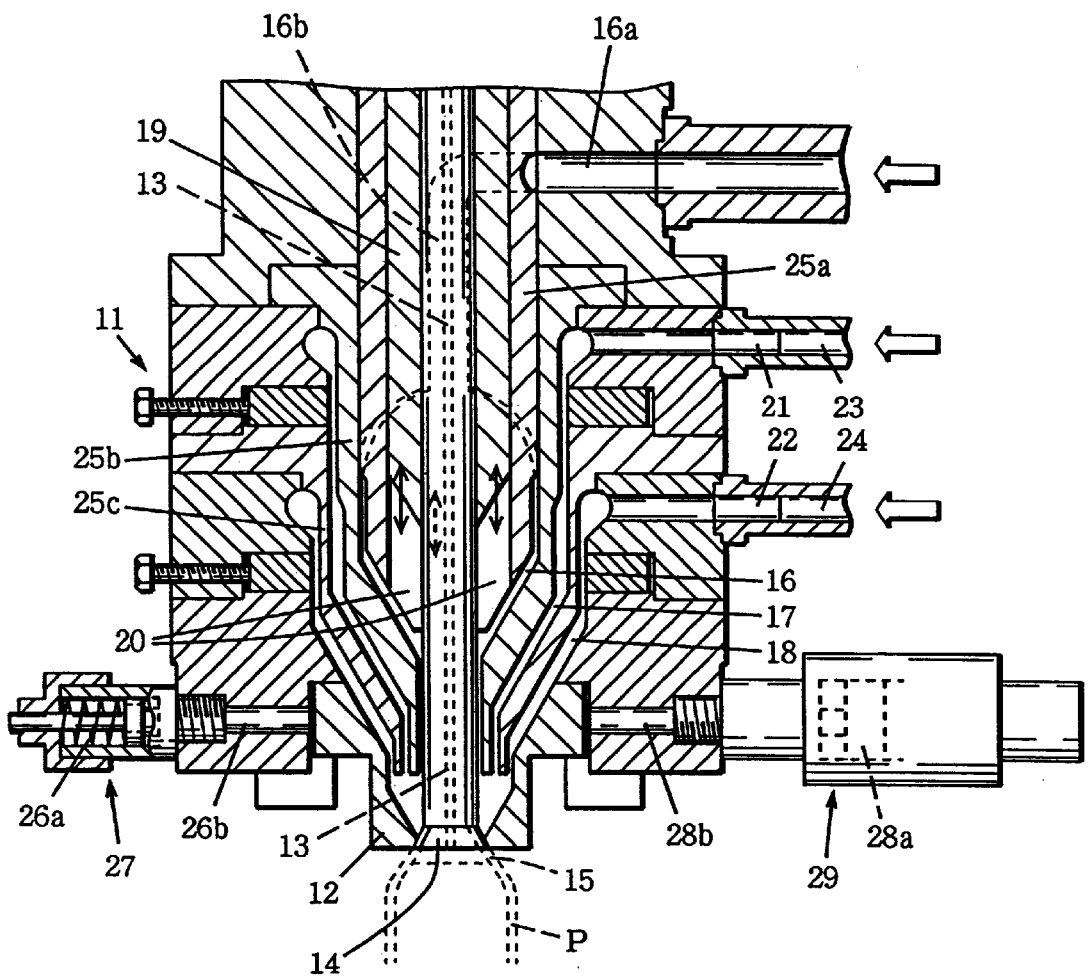
FIG. 2 is a generally longitudinal section view showing an exemplary extrusion molding machine of the invention.
Figure 3:
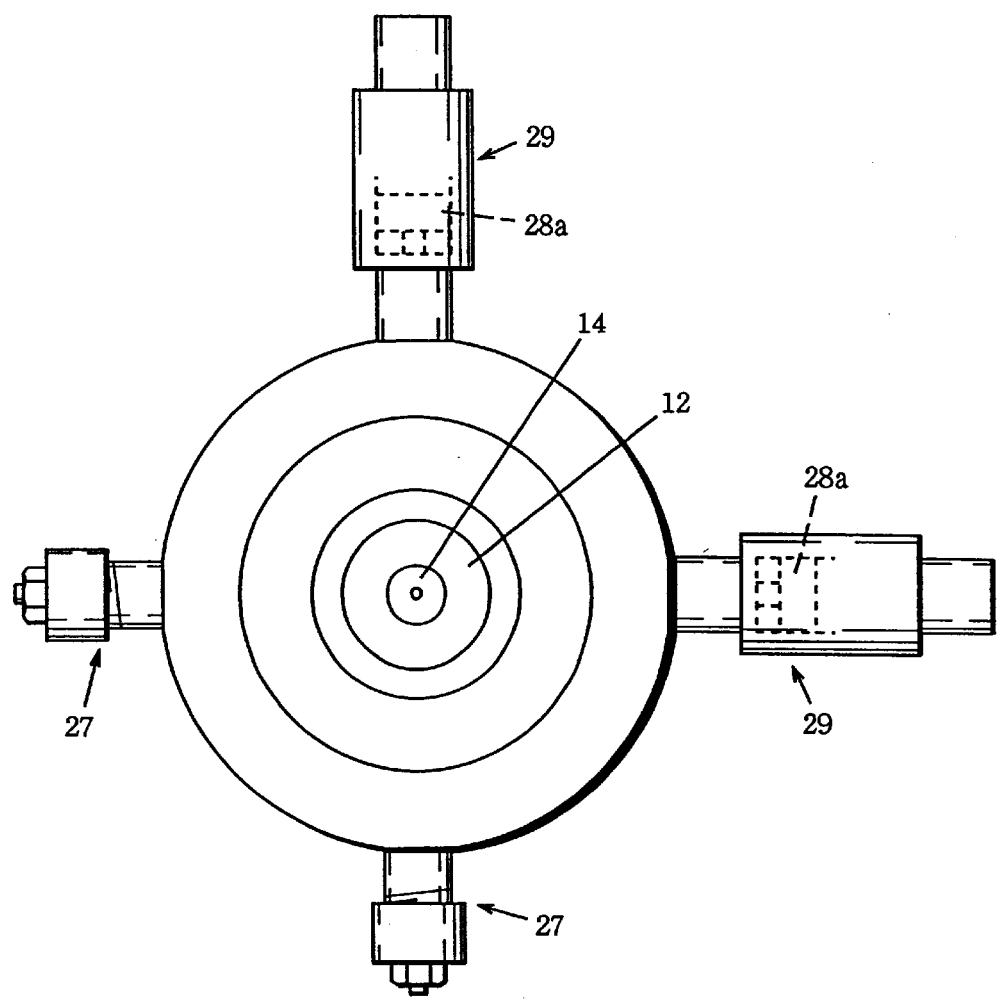
FIG. 3 is a general plan view showing an exemplary section adjusting means shown in FIG. 2.
Figure 4:
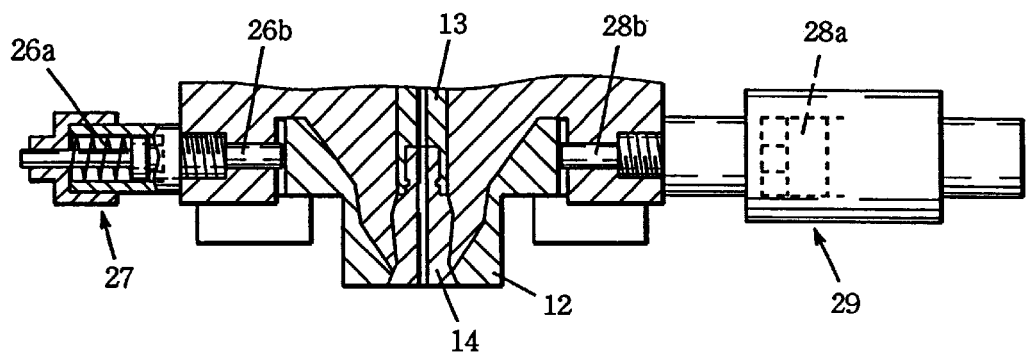
FIG. 4 is a longitudinal section view of the section adjusting means shown in FIG. 2.

FIG. 2 is a generally longitudinal section view showing an exemplary extrusion molding machine of the invention, FIG. 3 is a general plan view showing an exemplary section adjusting means shown in FIG. 2, and FIG. 4 is a longitudinal section view of the section-adjusting means shown in FIG. 2. The illustrated apparatus is intended for the manufacture of hollow tubes comprising a monolayer segment of a soft resin and a multilayer (three-walled) segment comprising an inner soft resin layer, an intermittent intermediate hard resin layer and an outer covering layer.

This extrusion molding apparatus comprises a head 11 equipped with a die 12 at its lower end, a rod 13 disposed slidably in an axial (vertical) direction in the axial space within the head 11, a mandrel 14 secured to the forward end of the rod 13 and adapted to form an annular slit 15 with a lip portion of the die 12 in association with the axial advancement of the rod 13 with respect to the die 12, and a plurality of (3 in the illustrated embodiment) annular passageways 16, 17, and 18 formed in concentric relation within the head 11. The mandrel 14 is slidable together with the rod 13 in response to the operation of a cylinder such as a hydraulic cylinder.

Of the above-mentioned annular passageways 16, 17, and 18, the first passageway (innermost annular passage way) 16, for the first resin such as the soft resin, that forms at least the inner wall of a hollow tube (or parison P) extends from an extruder on top of the head 11 through a resin inlet 16a and a resin passageway 16b and expands annularly into the die 12. Furthermore, a ring piston (extruding means) 19 adapted to reciprocate down to the first annular passageway 16 is disposed within the head 11 and a first molten resin accumulation chamber 20 for pooling molten resin temporarily in association with the reverse (upward) movement of the ring piston 19, the accumulation chamber 20 communicates with the first annular passageway 16 and annular slit 15. The first molten resin in the first resin accumulation chamber 20 is extruded continuously in response to the forward movement of the ring piston 19. The second annular passageway (intermediate passageway) 17, for the second resin such as the hard resin, which forms intermittently or periodically the intermediate wall of the multilayer segment of the hollow tube and the third passageway (outer annular passageway) 18, for the third resin forming the outer covering layer, which forms the outer wall of the hollow tube are also supplied with molten resin. The second molten resin in a second resin accumulator 21 is extruded intermittently or periodically in response to the forward movement of the plunger 23, and the third molten resin in a third resin accumulator 22 is extruded continuously in response to the forward movement of the plunger 24. The second and the third molten resins temporarily pooled in respective accumulators 21, 22 are fed on actuation of corresponding plungers 23, 24. In response to the return movement of the plungers 23, 24, each molten resin is supplied from the extruder means connected to the head 11 and pooled in the accumulators 21, 22. The molten resins flow through the first through third annular passageways 16, 17, 18 and these tributary resin streams converge within the die 12. The outer covering resin layer may be formed with the soft resin or the hard resin.

The head 11 is further provided with annular partition walls 25a, 25b, 25c for isolating the annular passageways 16, 17, 18. In this embodiment, the supply means for feeding molten resin to the annular passageways 16, 17, 18 is comprised of the extruder and either the ring piston or the plungers.

In operation, the rod 13 is driven back (in the upward direction) to engage the lip portion of the die 12 with the mandrel 14 in close contact and the ring piston 19 is driven back axially to pool the molten resin for the inner wall in the first resin accumulation chamber 20, while the second and third annular passageways 17, 18 are respectively supplied with the second and third molten resins. Then, the rod 13 is driven forward (downward) to make an annular slit 15 between the lip of die 12 and the mandrel 14, the ring piston 19 and plunger 24 are continuously driven forward, and the plunger 23 is intermittently driven forward, whereupon a parison P having a three-walled portion (segment) is formed by convergence of resin streams and extruded from the annular slit 15. After formation of the parison, the rod 13 is driven back (upward) to close the annular slit 15 with the mandrel 14 and the ring piston 19 is driven back to accumulate molten resin in the first accumulation chamber 20, while the plungers 23, 24 are driven back to let the accumulators 21, 22 accumulate molten resin for the intermittent intermediate wall and the molten resin for the outer wall to be supplied to the second and third annular passageways 17, 18, respectively. By causing the above operation to be repeated, the parison P and hollow tube can be produced on an intermittent basis. However, if, in this operation, the rod 13 is driven back after formation of parison P with section adjustment, a gap will be formed between the die 12 and mandrel 14 so that the resin will leak out to cause a loss of material.

Unlike the conventional arrangement where simultaneously with the opening of the annular slit 15 in response to the advancement of rod 13, the die 12 is displaced radially from the original position where it is closely abutted against the mandrel 14 (that is the reference position of the die 12 where the axes of mandrel 14 and die 12 are aligned and no gap is formed between the die 12 and mandrel 14) to adjust the thickness and thereby form a parison P uniform in overall thickness before the rod 13 is driven back. Therefore, in the present invention, the die 12 is reset to the original position after formation of parison P and, then, the rod 13 is driven back. In this arrangement (i.e. centering operation), the die 12 can be returned to the original position to bring the axes of die 12 and mandrel 14 into alignment before the rod 13 is driven back to thereby insure a close contact between the die 12 and mandrel 14, with the result that no gap is formed between them.

Thus, the apparatus of the present invention comprises a thickness adjusting means for displacing the die 12 from its original position in association with the advance of the rod 13 to adjust the thickness variation of the parison P extruded from the annular slit 15, the ring piston 19, and plungers 23, 24 (extruding means) for extruding molten resins from the resin accumulation chamber 20 and accumulators 21, 22 from the annular slit 15 to form a parison P, a resetting means for resetting the die 12 to the original position in response to completion of extrusion of molten resin, and the hydraulic cylinder (rod-driving mechanism) for driving the rod 13 forward to open the annular slit 15 and driving the rod 13 back to close the annular slit 15 in response to the resetting of the die 12.

The thickness adjusting means and resetting means mentioned above may each comprise a biasing means for preenergizing the die 12 inwardly in a plurality of circumferential positions and a pressing means movable forward and backward and adapted to press the die 12 inwardly against the biasing means. For example, as shown in FIGS. 3 and 4, there is provided a biasing member 27 equipped with a spring 26a for biasing the die 12 inwardly and a pressor rod 26b for pressing a flat surface formed in the die 12 by means of the preenergizing force of the spring in two circumferential positions adjacent to each other 90° apart on the die 12. Disposed in the position diametrically opposite to the position preenergized by the biasing member 27 is a driving mechanism 29 comprising a hydraulic cylinder 28 (as a pressor means) operable with respect to the die 12 and a pressing rod 28b for transmitting the pressing force of the hydraulic cylinder 28 to the flat surface of the die 12. Namely, a plurality of the opposite positions of the die are pressed inwardly (or radially) by the biasing means and the pressing means. By means of such thickness adjusting means and resetting means, the die 12 is displaced according to the stroke of the cylinder 28 and, as the pressing force of the cylinder 28 is released, the spring 26 of the biasing member 27 resets the die 12 rapidly to the original position prior to thickness adjustment. Furthermore, since the die 12 can be displaced in two diagonal directions by the hydraulic cylinders 28a disposed in diagonal orientations, the variation in thickness can be effectively precluded even when a plurality of layers are extruded to form a parison P. The displacement and resetting of die 12 can be carried out by means of one set of thickness adjusting means and resetting means, it is more advantageous to displace the die 12 in at least two positions for a more accurate thickness adjustment.

The bias in thickness of parison P, assuming that the extrusion speed is unchanged, is chiefly associated with the size and thickness of parison P and a correlation is found between the size and thickness of parison P and the necessary degree of thickness adjustment (degree of adjustment of the slit dimension). Therefore, the adjustment of this bias can be made automatically according to the above-mentioned correlation.

The extruding means for extruding the molten resins from the annular slit 15 are not limited to the ring piston 19 and plungers 23, 24 but a variety of other extrusion mechanisms for molten resins can be employed. In other to preclude bending and insure a precision forming of parison P, the extruding means is preferably the ring piston 19. For the extrusion of the second and third resins, too, ring pistons 19 can be used in lieu of the accumulators and plungers 23, 24. The third annular passageway 17, the accumulator 22 and the plunger 24 are not essential for the present invention.

The operation described above can be performed by means of an automatic system comprising an input means with which the desired values of parison P such as the total size, total wall thickness, and the thickness and length of the second resin layer can be entered, an operation circuit which calculates the amount of control necessary for each action according to the input data and the data (the thickness adjustment data corresponding to the factors of parison P such as the total size, total thickness, and the thickness and length of the second resin layer) stored in a memory (memory means), and a control circuit which outputs a control signal representing the amount of control to be applied to a driving circuit for the mechanism. Regarding the action for the thickness adjustment (step 1), for instance, the size and wall thickness of parison P are entered from the input means of the automatic system and based on the data (thickness adjustment data correlated with the size and wall thickness of parison P) stored in the memory (memory means), the stroke (control amount) of the hydraulic cylinder as the thickness adjusting means or the resetting means is computed in the operation circuit. In the above control system, the control circuit responding to a start signal from the input means outputs a forward signal to the driving circuit for the hydraulic cylinder to drive the rod 13 and, at the same time, the control circuit outputs a driving signal corresponding to the amount of control to the driving circuit for the hydraulic cylinder 28a for thickness adjustment to drive the hydraulic cylinder by a given distance either way.

Furthermore, as mentioned above, the control circuit responding to the start signal outputs the control amount data calculated by the operation circuit according to input thickness data as a forward signal to the driving circuit for the hydraulic cylinder for driving the rod 13 to cause the rod 13 to slide forward by a distance corresponding to the wall thickness of parison P (step 2).

With regard to the extruding action (step 3) for forming the parison P, the control circuit responding to the start signal or sensing completion of extension of the hydraulic cylinder 28a for thickness adjustment outputs a forward signal to the driving circuit for the hydraulic cylinder which drives the ring piston 19 and the driving circuit for the hydraulic cylinders which drives the plungers 23, 24 to thereby cause the ring piston 19 and plungers 23, 24 to slide each by a given distance.

In the extruding step, the second molten resin is intermittently or periodically extruded corresponding to the thickness and length of the second resin layer of the multilayer segment by the plunger 23 with controlling the sliding speed of the plunger 23, and the third molten resin continuously extruded to form the outer covering layer.

The resetting action (step 4) takes place as follows. In response to completion of movement of the ring piston 19 and plungers 23, 24, the control circuit outputs a reset signal to the driving circuit of the hydraulic cylinder 28 for thickness adjustment to cause an action opposite to the thickness adjustment action so as to reset the hydraulic cylinder 28a to the original position. The control circuit responding to the reset signal or completion of the resetting motion of the hydraulic cylinder outputs a back signal to the driving circuit of the hydraulic cylinder for driving the rod 13 to thereby drive the rod 13 in a reverse direction to close the annular slit 15 (step 5).

Furthermore, in response to a signal representing completion of the reverse movement of rod 13, the control circuit outputs a back signal to the driving circuit of ring piston 19 and the driving circuit of plungers 23, 24 to cause the ring piston 19 and plungers 23, 24 to retreat each by a predetermined distance and thereby letting a predetermined amount of molten resin accumulate in each of the molten resin accumulation chamber 20 and accumulators 21, 22 (step 6).

Then, in response to a signal representing completion of the reverse movement of the ring piston 19 and plungers 23, 24, the control circuit outputs a forward signal to the driving circuit for the rod 13 and the driving circuit for the hydraulic cylinder 28a for thickness adjustment to repeat the thickness adjustment action (the action of step 1) through the action of step 16 (resin accumulation).

With the extrusion molding apparatus described above, the step of advancing the rod 13 to open the annular slit 15, the thickness adjusting step for displacing the die 12 from its original position, the extruding step of extruding the resins in the molten resin accumulation chamber 20 and the accumulator 21, 22 from the annular slit 15 to form a parison P, the step of resetting the die 12 to the original position, the step of driving the rod 13 in a reverse direction to close the annular slit 15, and the step of accumulating molten resins in the molten resin accumulation chamber 20 and accumulators 21, 22 can be executed in repetition for continuous production of hollow tubes at a predetermined interval. Particularly since the die 12 is reset into axial alignment with the mandrel 14, i.e. centering of the die 12 and the mandrel 14, before the rod 13 is driven back, the annular slit 15 can be tightly closed with the mandrel 14 even after thickness adjustment, the creation of a gap between die 12 and mandrel 14 is precluded. Therefore, a parison of uniform wall thickness can be produced and molten resin leaks can be prevented even when thickness adjustment is made.

Although the above description pertains to the production of a parison having a three-walled structure, the multilayer segment of the parison may be a two-walled (layered) structure comprising the soft resin layer and the hard resin layer.

The extrusion molding apparatus of the present invention is also of use as a preblowing means which infuses or supplies a gas such as air into the parison for shape retention through the bore formed axially in the rod 13.

In the above apparatus, the pressing means constituting the thickness adjusting means and resetting means are not restricted to hydraulic cylinders 28 but can be other known reciprocal driving means capable of forward and reverse actions and having a positioning function, such as reciprocal mechanisms utilizing a stepping motor (e.g. a worm and rack system which transforms the rotary motion of a stepping motor into a reciprocating motion through gearing), for instance. The biasing means may be any known means, for example a variety of cylinders, shock absorbers, and other means capable of biasing with a constant pressure.

In the production apparatus and molding method of the present invention, the sequence is that a parison is formed after thickness adjustment and the rod is driven back after the die has been reset to the original position (centering position). Therefore, not only the sectional uniformity of the parison can be insured but also the slit between the die and mandrel can be hermetically closed. Therefore, resin leaks can be positively prevented to permit effective utilization of the resin for the formation of the parison and hollow tube. Furthermore, since thickness adjustment is made in a plurality of positions of the die, the variation in wall thickness can be adjusted with high accuracy even in the production of a tube having a multi-layer portion so that parisons and hollow tubes of exact thickness can be manufactured.

What is claimed is:

1. A method of extruding a plurality of molten resins each accumulated in a molten resin accumulation chamber from an annular slit defined by a die and a mandrel to form a parison, which comprises (1) a step of driving a rod forward to open said annular slit and displacing radially the die from an original position adjoining to said mandrel to correct for variation in thickness of a parison to be extruded from said annular slit, (2) a step of extruding the resins in each said molten resin accumulation chamber from said annular slit to form a parison, (3) a step of resetting said die to said original position after extrusion of the resins, (4) a step of driving said rod in a reverse direction to close said annular slit with respect to said mandrel after said resetting of the die, and (5) a step of accumulating molten resins in each said molten resin accumulation chamber after closure of the annular slit, said steps being executed repeatedly in the sequence mentioned to form parisons on an intermittent basis, wherein said extruding step (2) comprises extruding continuously a soft resin accumulated in a first accumulation chamber, with extruding and joining a hard resin accumulated in a second accumulation chamber at a time interval with said soft resin, a parison for forming a hose comprises a monolayer segment formed with the soft resin layer and a multilayer segment formed with the soft resin layer and the hard resin layer, and said monolayer segment forms a connection end at both edges of the parison, and the thickness of the soft resin layer is thinner than that of the hard resin layer in said multilayer segment.

2. A method of forming a parison according to claim 1 for the production of a hollow tube having a multi-walled segment, which comprises supplying molten resins through a plurality of annular passageways provided in a concentric pattern, converging streams of molten resins from said passageways and extruding the resins from an annular slit to form a parison, wherein said step (1) comprises biasing the die inwardly in a plurality of circumferential positions and pressing the die inwardly in opposite directions with a pressing means movable forward and backward, and said extruding step (2) comprises extruding the molten resin accumulated in the molten resin accumulation chamber formed at least in the innermost one of said plurality of annular passageways with a ring piston.

* * * * *